US011281983B2

(12) United States Patent
Vallam et al.

(10) Patent No.: US 11,281,983 B2
(45) Date of Patent: Mar. 22, 2022

(54) MULTI-AGENT SYSTEM FOR EFFICIENT DECENTRALIZED INFORMATION AGGREGATION BY MODELING OTHER AGENTS' BEHAVIOR

(71) Applicant: International Business Machines Corporation, Armonk, NY (US)

(72) Inventors: Rohith D. Vallam, Bangalore (IN); Rakesh Pimplikar, Bangalore (IN); Kushal Mukherjee, Bangalore (IN); Ramasuri Narayanam, Bangalore (IN); Ritwik Chaudhuri, New Delhi (IN); Gyana Ranjan Parija, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 16/120,802

(22) Filed: Sep. 4, 2018

(65) Prior Publication Data

US 2020/0074328 A1 Mar. 5, 2020

(51) Int. Cl.
*G06N 5/04* (2006.01)
*G06N 7/08* (2006.01)

(52) U.S. Cl.
CPC .............. *G06N 5/043* (2013.01); *G06N 7/08* (2013.01)

(58) Field of Classification Search
CPC ................................. G06N 5/043; G06N 7/08
See application file for complete search history.

(56) References Cited

U.S. PATENT DOCUMENTS

| 7,926,029 B1 | 4/2011 | Stoyen et al. |
| 8,478,677 B2 | 7/2013 | Solomon |
| 8,515,884 B2 | 8/2013 | Doctor et al. |

(Continued)

FOREIGN PATENT DOCUMENTS

WO 2013089823 A1 6/2013

OTHER PUBLICATIONS

Bournenane, Malika, Abdelhamid Mellouk, and Djilali Benhamamouch. "Reinforcement learning in multi-agent environment and ant colony for packet scheduling in routers." Proceedings of the 5th ACM international workshop on Mobility management and wireless access. 2007. (Year: 2007).*

(Continued)

*Primary Examiner* — Eric Nilsson
(74) *Attorney, Agent, or Firm* — Ryan, Mason & Lewis, LLP (57) ABSTRACT

A computer-implemented method is disclosed which includes receiving an initial decision from each of a plurality of agents based on the same criteria, wherein at least a subset of the agents are computing nodes, and wherein the criteria pertain to a resource allocation request; assigning an equal weight to resources specific to each of the agents; generating, for each of the initial decisions, a revised decision based on (i) comparing the initial decisions to each other, (ii) modeling aggregate group behavior represented by the initial decisions of the plurality of agents, and (iii) modeling a behavior of each of the agents in view of the initial decisions; updating the weights assigned to the resources specific to each of the agents based at least in part on the revised decisions; and dynamically allocating resources in response to the resource allocation request based at least in part on the updated weights.

20 Claims, 7 Drawing Sheets

(56) References Cited

U.S. PATENT DOCUMENTS

| | | |
|---|---|---|
| 9,292,832 B2 | 3/2016 | Goel et al. |
| 2008/0253613 A1* | 10/2008 | Jones .................. G06K 9/00335 |
| | | 382/103 |
| 2009/0198613 A1 | 8/2009 | Reeves et al. |
| 2010/0153142 A1 | 6/2010 | Vasudevan et al. |
| 2013/0080641 A1* | 3/2013 | Lui ....................... H04L 43/045 |
| | | 709/226 |
| 2017/0242899 A1 | 8/2017 | Jolley et al. |
| 2019/0049975 A1* | 2/2019 | Kattepur .............. G06Q 10/087 |

OTHER PUBLICATIONS

Jung, Hyuckchul, and Milind Tambe. "Performance models for large scale multiagent systems: using distributed POMDP building blocks." Proceedings of the second international joint conference on Autonomous agents and multiagent systems. 2003. (Year: 2003).*

Keyhanipour, Amir Hosein, et al. "Integration of data fusion and reinforcement learning techniques for the rank-aggregation problem ." International Journal of Machine Learning and Cybernetics 7.6 (2016): 1131-1145. (Year: 2016).*

Gmytrasiewicz et al., A Framework for Sequential Planning in Multi-Agent Settings, J. Artif. Intell. Res. 24: 49-79 (2005).

* cited by examiner

1: procedure RAG-TOM_UPDATE (init-belief, action, observ)
2: returns revised belief
3:     Computation of Agent-specific Particle Allocation Weights
4:         ▷ Store the predication made by this particle about other agents' actions
5:         ▷ Recompute weights for other agents based on how an agent is predicting actions of other agents
6:     Importance Sampling
7:         ▷ Allocate particles in proportion to the weight of the corresponding agent.
8:     Selection
9:         ▷ Resample with replacement $M$ particles according to the importance weights.

MULTI-AGENT SYSTEM FOR EFFICIENT DECENTRALIZED INFORMATION AGGREGATION BY MODELING OTHER AGENTS' BEHAVIOR

FIELD

The present application generally relates to information technology, and, more particularly, to decentralized information aggregation using a framework that models other agents' behavior within each agent's model.

BACKGROUND

To enable collaborative artificial intelligence (AI) tasks, businesses need to decentralize information aggregation. Such decentralization of information aggregation enables collaboration among enterprises, allows agents developed in various different AI tasks to be reused and allows humans to loop into the process of collaboration among machine-based agents.

One example of decentralized information aggregation is rank aggregation. Rank aggregation deals with the problem of finding a permutation (or ranking) of a set of items by combining information from a collection of input rankings on the same set of items. This problem has a history in the fields of information retrieval, meta-search, social choice theory, e-commerce, committee decision making, etc. Several rank aggregation problems include aggregating full rank lists and partial rank lists.

SUMMARY

In one embodiment of the present invention, techniques for a multi-agent system and method for efficient decentralized information aggregation are provided wherein each agent models the behavior of the other agents. An exemplary computer-implemented method includes receiving an initial decision from each of a plurality of agents based on the same criteria, wherein at least a subset of the plurality of agents are computing nodes, and wherein the criteria pertain to one or more resource allocation requests. Such a method can also include assigning an equal weight to resources specific to each of the plurality of agents, and generating, for each of the initial decisions, a revised decision based at least in part on (i) comparing the initial decisions to each other, (ii) modeling aggregate group behavior represented by the initial decisions of the plurality of agents, and (iii) modeling a behavior of each of the agents in view of the initial decisions of the plurality of agents. Further, such a method can include updating the weights assigned to the resources specific to each of the plurality of agents based at least in part on the revised decisions, and dynamically allocating resources in response to the one or more resource allocation requests based at least in part on the updated weights.

In another embodiment of the invention, an exemplary computer-implemented method includes receiving an initial decision from each of a plurality of agents based on the same criteria, wherein at least a subset of the plurality of agents are computing nodes, and wherein each initial decision comprises a ranking of a set of items. Such a method can also include assigning a first weight to resources specific to each of the plurality of agents, and generating, for each of the initial decisions, a revised decision based at least in part on (i) comparing the initial decisions to each other, (ii) applying a partial Markov decision process to model aggregate group behavior represented by the initial decisions of the plurality of agents, and (iii) modeling behavior of each of the plurality of agents in view of the initial decision of each agent. Additionally, such a method can include assigning a second weight to the resources specific to each of the plurality of agents based at least in part on the revised decisions, and dynamically allocating resources in response to the one or more resource allocation requests based at least in part on the second weight assignments.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Embodiments of the present invention will now be described in further detail with regard to systems and methods for a decentralized multi-agent system for information aggregation with a set of autonomous agents wherein each agent models the information of the other agents, thereby leading to more beneficial outcomes (i.e., utility) for each agent.

Accordingly, embodiments of the present invention present a system and method that performs dynamic allocation of resources while computing the updated decision/strategy for each agent in the process of collaborative information aggregation and this method leads to efficient approximation of an agent's behavior. The term "behavior" as used herein is understood to mean a potential decision of an agent or of anther agent.

In one exemplary embodiment, a system and method described herein can be used by, for example, a project funding agency that solicits a large number of proposals. In one exemplary embodiment, a system and method described herein can determine a ranking order of the proposals to arrive at a shortlist of a small number of proposals for actual funding. In one exemplary embodiment, a system and method described herein can be used in award processing to arrive at a shortlist of candidates.

As further detailed herein, one or more embodiments of the invention include generating and/or implementing a decentralized multi-agent system for information aggregation with a set of autonomous agents.

Figure 1:
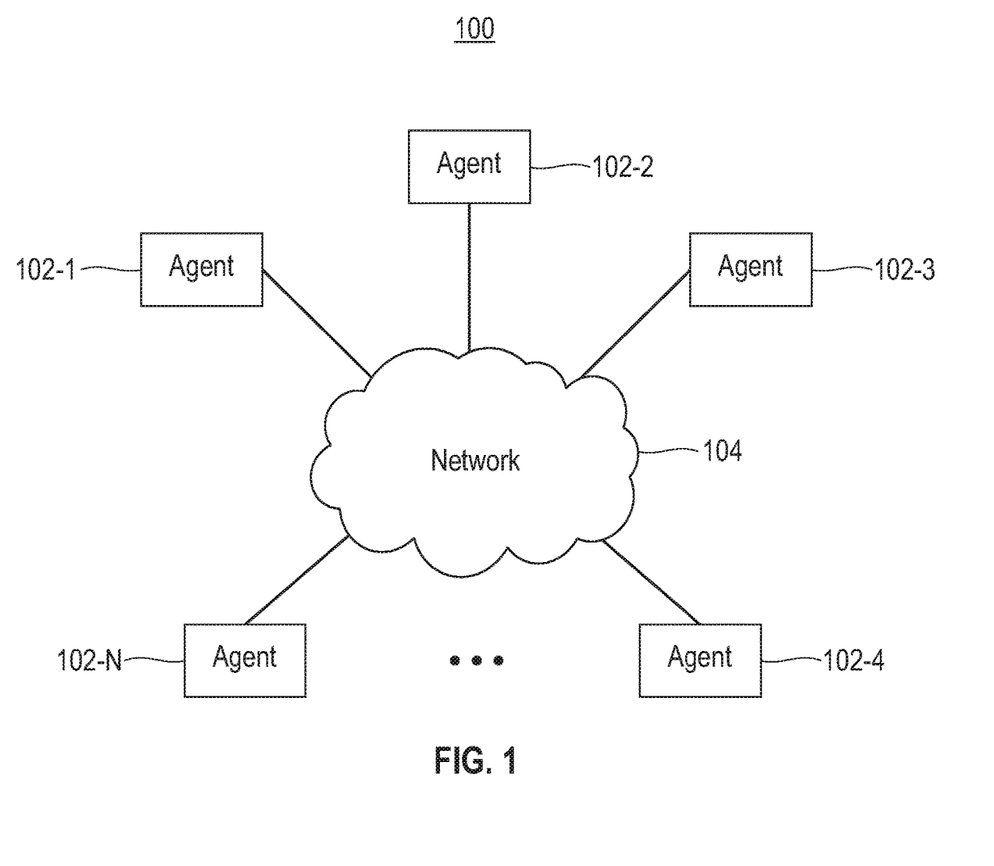
FIG. 1 shows a system diagram of an information processing system, according to an embodiment of the present invention.

FIG. 1 is a system diagram of an information processing system 100, according to an embodiment of the present invention. Information processing system 100 contains agent 102-1, agent 102-2, agent 102-3, agent 102-4 and up to agent 102-N connected to network 104. The term "agent" as used herein refers to one or more of a computing node without any user input, a computing node with user input, and a (human) user. In general, at least a subset of the plurality of agents are computing nodes with or without user input. Also, in general, the network is a computer communication network in which agents can interact with each other in terms of their decisions/actions.

Figure 2:
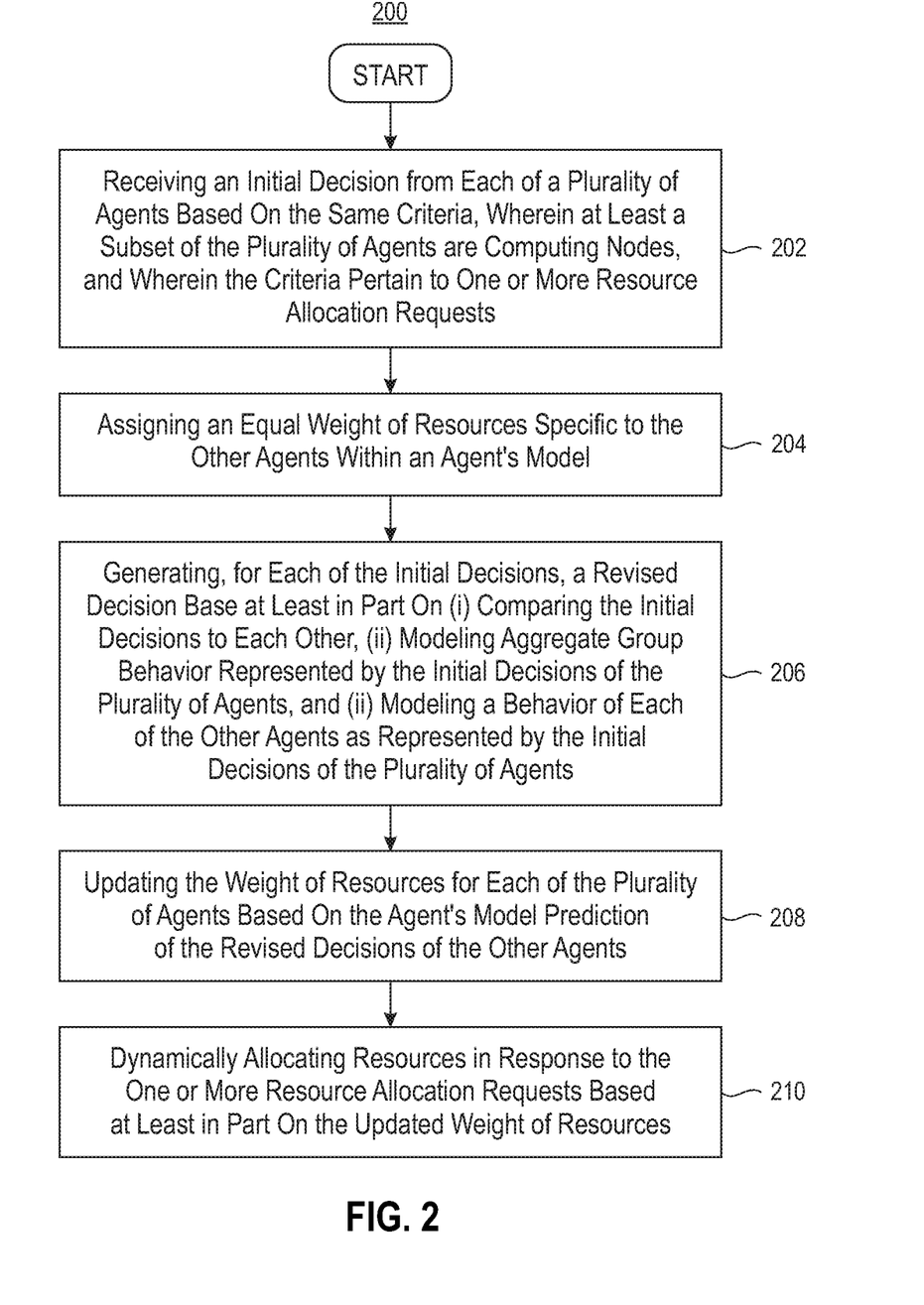
FIG. 2 shows a flow diagram of a method for a decentralized multi-agent system for information aggregation, according to an embodiment of the present invention.

FIG. 2 shows a flow diagram of the steps of a computer-implemented method 200 according to an embodiment of the present invention. Step 202 includes receiving an initial decision from each of a plurality of agents based on the same criteria. The initial decisions can be received by any type of device known in the art, e.g., cellular phone devices, tablet computers, laptop computers, repeaters, personal digital assistants (PDA), scanners, network connected appliances or other devices that include computing circuitry that are configured to wirelessly communicate with one or more other devices. In general, the criteria to which an initial decision is made will pertain to one or more resource allocation requests. For example, as will be discussed below with respect to FIG. 3, a resource allocation request can be a request for a ranking of a set of items such as, for example, ranking of a proposal and in award processing.

Step 204 includes assigning an equal weight of resources specific to the other agents within an agent's model. Step 206 includes generating, for each of the initial decisions, a revised decision based at least in part on (i) comparing the initial decisions to each other, (ii) modeling aggregate group (i.e., the set of the other agents) behavior represented by the initial decisions of the plurality of agents, and (iii) modeling a behavior of the other agents in view of the initial decisions of the plurality of agents. First, the initial decisions will be compared to the other initial decisions such that the agent making the comparison will provide the same or different decision as the initial decision. When the decision is different, the comparison will be based on a prediction by each respective agent.

An example embodiment of a model for information aggregation (Rank Aggregation) will be described below. As one skilled in the art will appreciate, the model can be used for both modeling aggregate group behavior represented by decisions of the plurality of agents, and modeling behavior of individual agents in view of the initial decisions of the agents. The term "players" as used herein is also another term for "agents."

By way merely of illustration, consider a setting wherein N players are playing a multi-round rank aggregation game (RAG) over a finite time horizon T. Let $\mathbb{P}=\{1, \ldots, P\}$ be the set of discrete actions from which each player i can choose from in every round of the RAG. The utility of player i in a round t is given by $$u_i^t(a_i^t, a_{-i}^t) = e_i^t - a_i^t + \frac{\beta}{N}\sum_{k=1}^{N} a_k^t$$

where $e_i^t$ is the endowment given to player i in round t and $a_i^t$ is the action of the player i in round t and $a_{-i}^t$ is the action of all the players except player i in round t.

The total discounted utility of player i is given by $\mathbb{U}_i^T = \sum_{t=1}^{T} \gamma^{t-1} u_k^t(a_i^t, a_{-i}^t)$ where $\gamma \in (0, 1]$ is the discount factor for the multi-round RAG. It is assumed that each player plays the multi-round RAG so as to optimize $\mathbb{U}_i^T$.

In one exemplary embodiment, each agent is modeled individually using an interactive partially observable Markov decision process (IPOMDP) framework based in part on each agent's prediction or subjective opinion about how the whole group behaves (acts) collectively. In other words, this refers to the fact that each agent predicts the behavior of the other agents (i.e., potential decisions of the other agents). Based on the accuracy of the prediction, the agent will adjust the number (or weights) of the resources which in turn assists the agent to make a more accurate prediction about the behavior of the other agents. A "resource" refers to "particles" that are used by the model of each agent. Since each player models the aggregate group, behavior $\theta_G = (\theta_{G1}, \theta_{G2}, \ldots \theta_{GP})$ is defined as the strategy of the group as a whole in the RAG. In this case, $\theta_{Gk}$ denotes the probability of the group playing the $k^{th}$ action (from the set $\mathbb{P}$), i.e., $\theta_{Gk} = P(X_i = k | \theta_G) \forall$ players $i \in 1, 2, \ldots, n$.

By way of further illustration, let $\mathbb{P} = \{1, \ldots, P\}$ be the set of discrete actions from which each player i can choose an action in every round of the RAG. Also, let $X = \{X_1, X_2, \ldots X_n\}$ represent the discrete actions of all agents in a given round. The term "discreet actions" is used herein to refer to the number of decisions/actions that are fixed and finite, since every agent has a fixed and finite number of decisions/actions available. Each player i is modeled playing the multi-round RAG as an IPOMDP agent wherein the player has to choose its actions from the set $\mathbb{P}$ in every round. It is assumed that the group strategy parameter $\theta_G$ is drawn from a Dirichlet distribution whose parameters are given by $\alpha_G = (\alpha_{G1}, \ldots, \alpha_{GP})$, i.e., $\theta_G | \alpha_G$ Dirichlet $(\alpha_G)$ and $X_i | \theta_G$~Discrete $(\theta_G) \forall_i = 1, \ldots, n$.

After collecting data X, the following observations exist. $N = N_1, \ldots, N_P$ where $N_k$ denotes the number of occurrences of k in X. Bayes rule results in $\theta_G | X, \alpha_G$ Dirichlet $(N + \alpha_G)$. This property motivates the use of $\alpha_G$ as the physical state of the IPOMDP model, instead of $\theta_G$.

Accordingly, the IPOMDP model of an agent describes the environment state by the Dirichlet parameters of $\theta_G$ i.e., $S = \alpha_G$ which signifies the behavior of the entire group of agents. The action set of the player i is $A_i = \mathbb{P}$ as defined above and the joint action set of the players is denoted by $$\underset{x=1}{\overset{N}{\times}} A_i.$$

For simplicity of analysis, an action $\alpha_i$ of a player is represented by a P-size one-hot vector $e_1=(0, \ldots, 1, \ldots, 0)$ with 1 in the position corresponding to strategy $\alpha_i$.

The transition probability function of the IPOMDP is defined as $T_i: S \times A \times S \to [0,1]$ and is given by $T_i(s, \alpha, s')=\Pr(s'=\widehat{\alpha_G}|s=\alpha_G, \alpha(e_i, \ldots e_N))=1$ if $\hat{\alpha}_G + \Sigma_{i=1}^N e_{i,0}$ otherwise.

The observation function $(O_i = \Omega_i \times S \times A \to [0,1])$ of the IPOMDP is defined by $O_i(p, \alpha, s')=\Pr(o_i=p|s'=\alpha_G,$ $$a(e_1, \ldots e_N)) = \frac{\hat{\alpha}_G^P}{\sum_{q=1}^P \hat{\alpha}_g^q}.$$

The reward function of the IPOMDP is defined by $$R_i(s, a) = E - e_i \cdot \omega + \frac{\beta}{N}\left(\sum_{k=1}^N e_k \cdot \omega\right)$$

where $1<\beta<N$. Here $\omega=(c_1, \ldots, c_\mathbb{P})$ is a vector of the actual contributions ordered by index. The term "reward" refers to the expected gain/utility to an agent based on its own decision and its prediction about the other agents' behavior (decisions).

Figure 4:
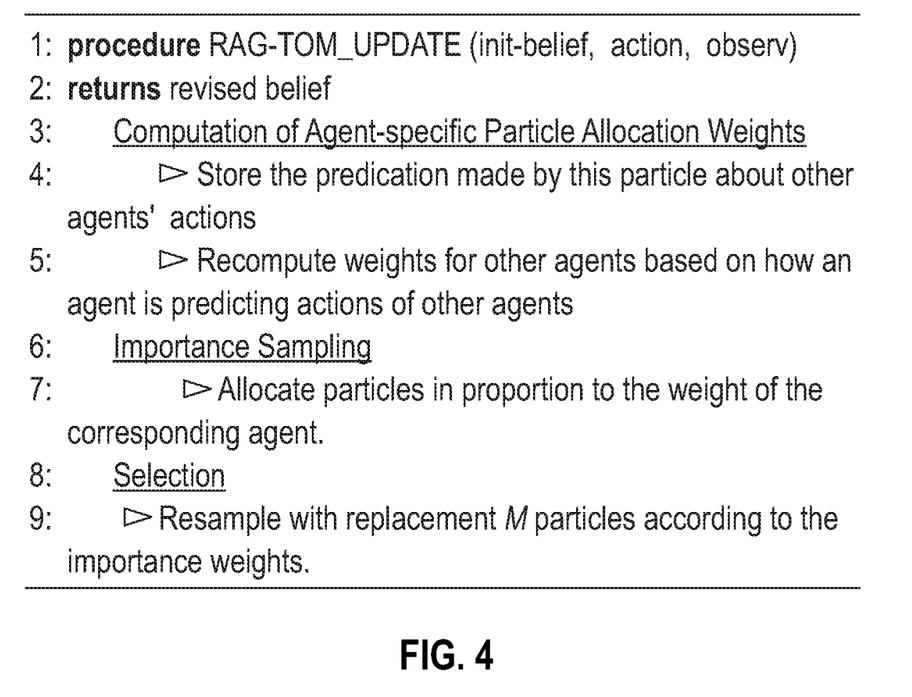
FIG. 4 shows a flow diagram illustrating techniques according to an embodiment of the invention.

Referring again to FIG. 2, step 208 includes updating the weight of resources for each of the plurality of agents based on the agent's model prediction of the revised decisions of the other agents. In one exemplary embodiment, updating the weight of resources for each of the plurality of agents based on the agent's model prediction of the revised decisions of the other agents can be as shown in the pseudocode of FIG. 4. For example, numbers (i.e., weights) can be assigned by computing agent-specific particle allocation weights. First, a prediction made by this particle about other agents' actions (decisions) is stored. A "particle" as used herein is a computing resource that is being utilized by each agent's model in order to predict the behavior/decisions of the other agents by making use of beliefs. Next, the number of resources for other agents based on how an agent is predicting actions of other agents are recomputed. In an exemplary embodiment, the number (i.e., weights) of the particles for the other agents are calculated based on the following principle. Specifically, the numbers are either increased or decreased for the particles/resources based on how efficiently the particles can predict the behavior/decisions of the other agents. For example, if the predictions made by the particles/resources are accurate, then the number of these particles/resources would be decreased. Otherwise, the number of the particles/resources would be increased.

Particles are then allocated in proportion to the weight of the corresponding agent. If the prediction made by a set of particles/resources associated with another agent (within the model of an agent) is not accurate, then it means that more particles/resources are required for accurately predicting that other agent's behavior in the next round. To accomplish this, the number of such particles are increased as described above. Because the number of these particles has increased, following the proportional weight based allocation scheme, the model of an agent allocates more particles to better predict the behavior of the other agent. Resample with replacement M particles according to the importance weights. "Resample with replacement" is a sampling strategy well known in statistics. For our purpose, as explained above, each agent's model dynamically allocates the number of resources/particles in each round based on the efficiency of predicting the other agents' behavior/decision. Then, the model of each agent follows this "resample with replacement" to dynamically allocate the number of particles/resources to the other agents within its modeling scheme.

Step 210 includes dynamically allocating resources in response to the one or more resource allocation requests based at least in part on the updated weight of resources.

In at least one embodiment of the invention, one or more the steps depicted in FIG. 2 can be repeated for a sufficient amount of time until an accurate decision has been made. For example, when ranking proposals, the computer-implemented method can be carried out until a desired ranking order has been determined.

Figure 3:
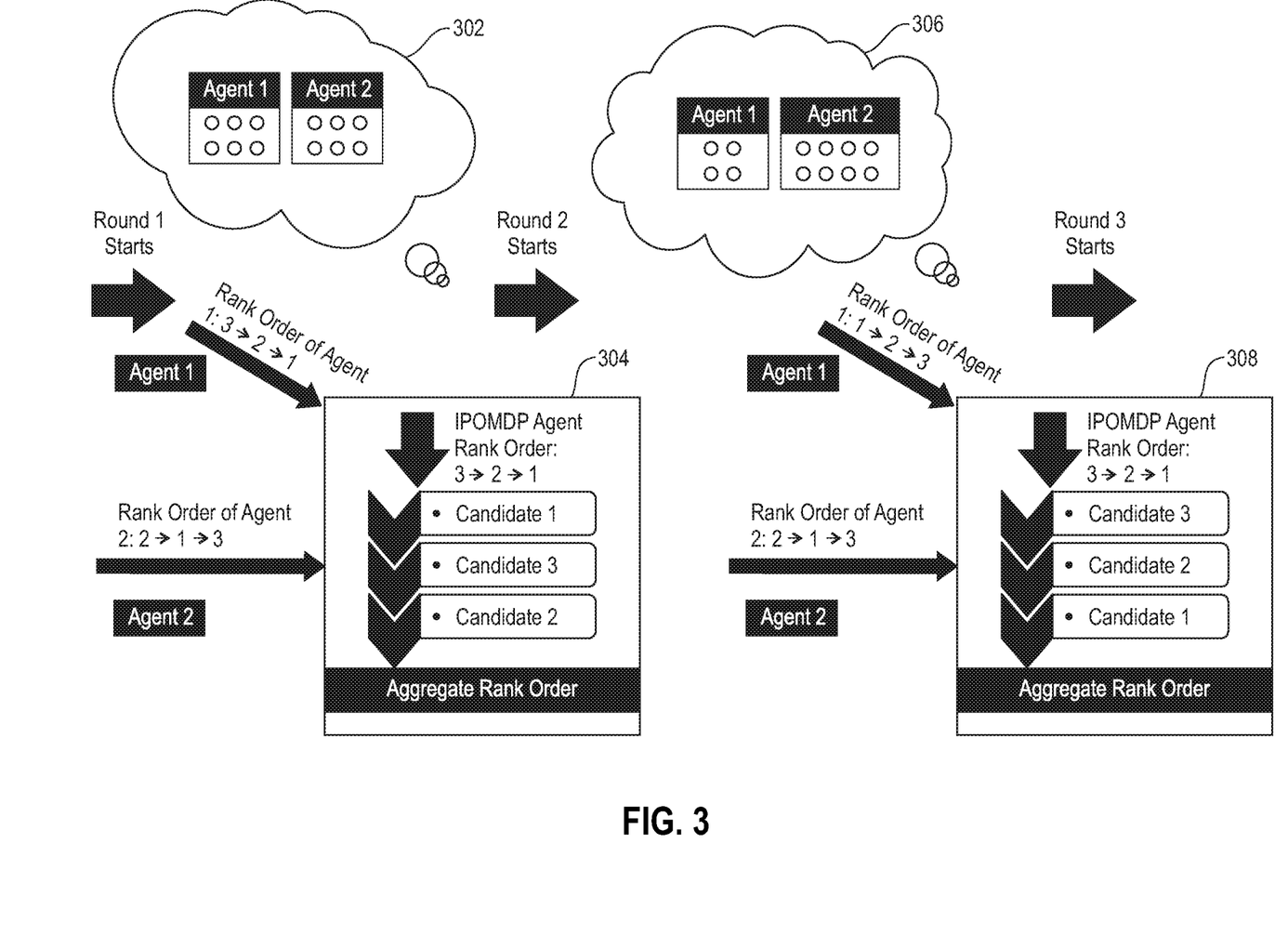
FIG. 3 shows a diagram illustrating a system for a ranking of items, according to an exemplary embodiment of the invention.

Further, as detailed herein, an exemplary embodiment of the invention is depicted in FIG. 3. As shown in FIG. 3, Round 1 includes each of agents 1 and 2 computing an initial rank order of candidates 1-3 in step 302. As seen in step 302, both agents 1 and 2 are assigned an equal weight of six particles for the initial decision. Agent 1 makes an initial ranking order of candidate 3, candidate 2 and candidate 1 whereas agent 2 makes an initial ranking order of candidate 2, candidate 1 and candidate 3. Step 304 first includes a comparison of the initial ranking order of the candidates provided by agents 1 and 2. Next, a revised decision is generated using an IPOMDP model to revise the aggregate rank order as candidate 1, candidate 3 and candidate 2.

Round 2 then includes step 306 in which a weight is assigned to each of the revised decisions. As seen in step 306, agent 1 is assigned a weight of four particles for the revised decision and agent 2 is assigned six particles for the revised decision. A revised decision is then updated in which agents 1 and 2 provide a new ranking of candidates. Agent 1 makes a new ranking order of candidate 1, candidate 2, and candidate 3 whereas agent 2 maintains a ranking order of candidate 2, candidate 1 and candidate 3. Step 308 first includes a comparison of the revised ranking order of the candidates provided by agents 1 and 2. Next, another revised decision is generated using an IPOMDP model to revise the aggregate rank order as candidate 3, candidate 2, and candidate 1. If necessary, one or more additional rounds can be carried out until a desired ranking order has been determined.

The techniques as described herein can also include, in accordance with one or more embodiments of the invention, providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques detailed herein can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
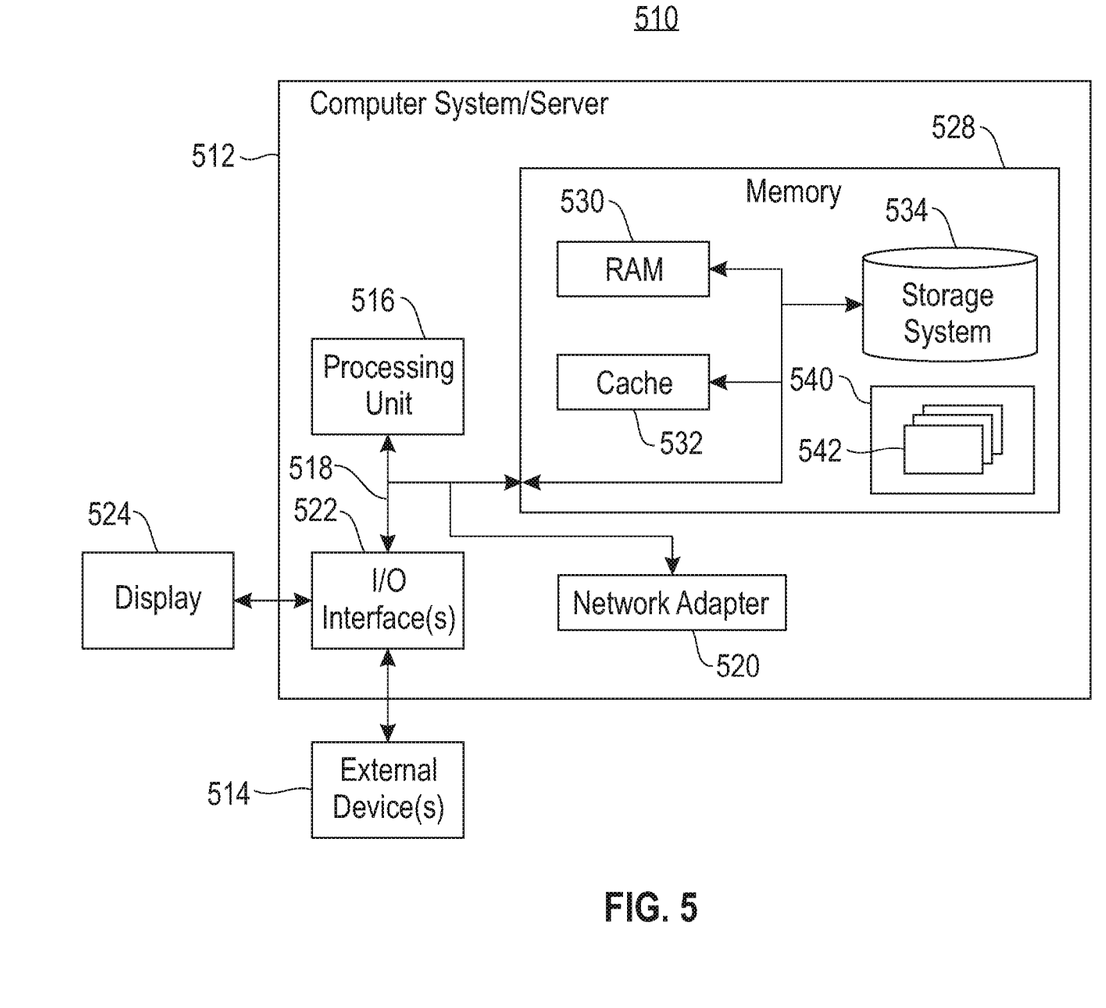
FIG. 5 shows a system diagram of an exemplary computer system on which at least one embodiment of the invention can be implemented.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a LAN, a general WAN, and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
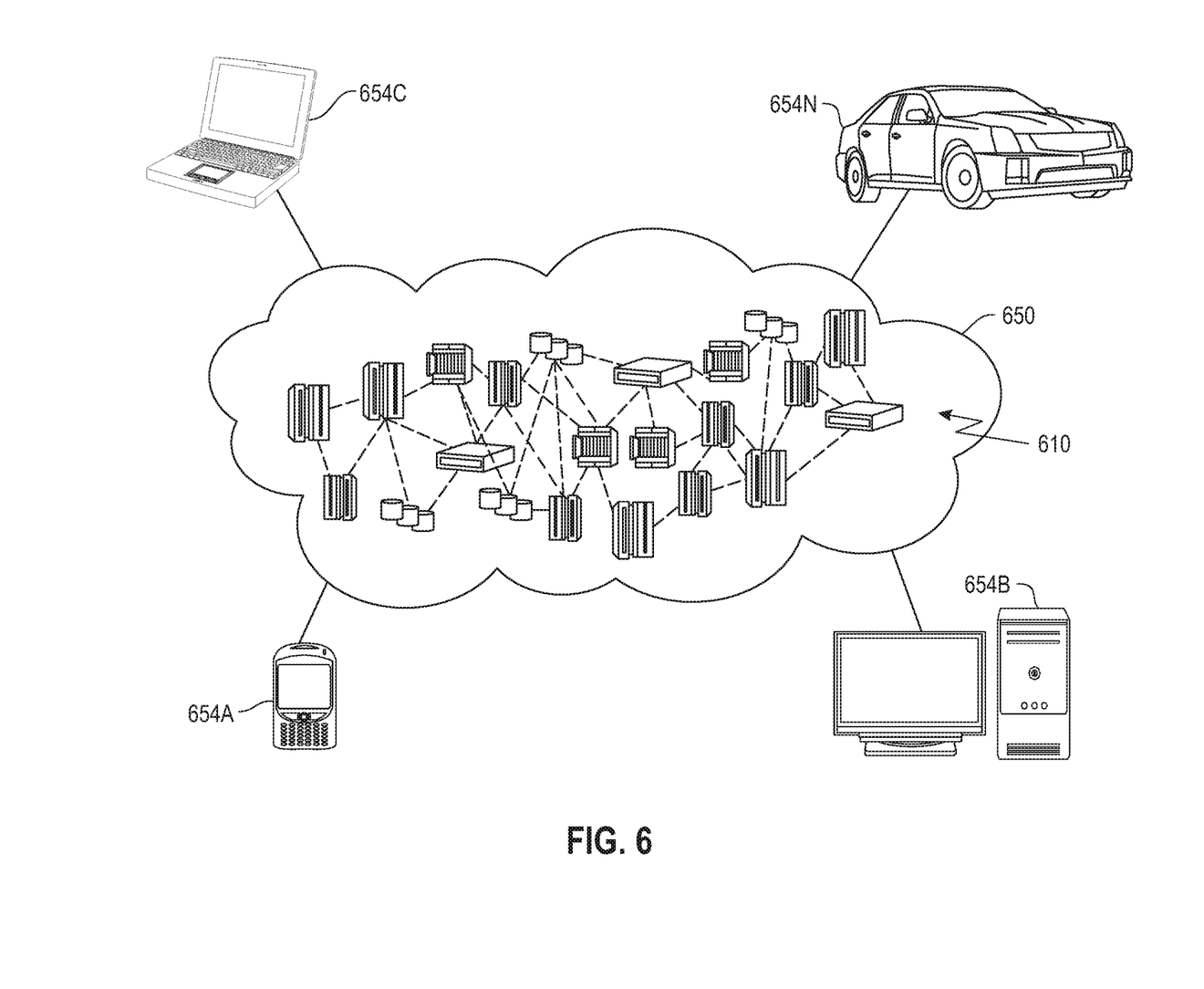
FIG. 6 shows a cloud computing environment according to an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, PDA or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
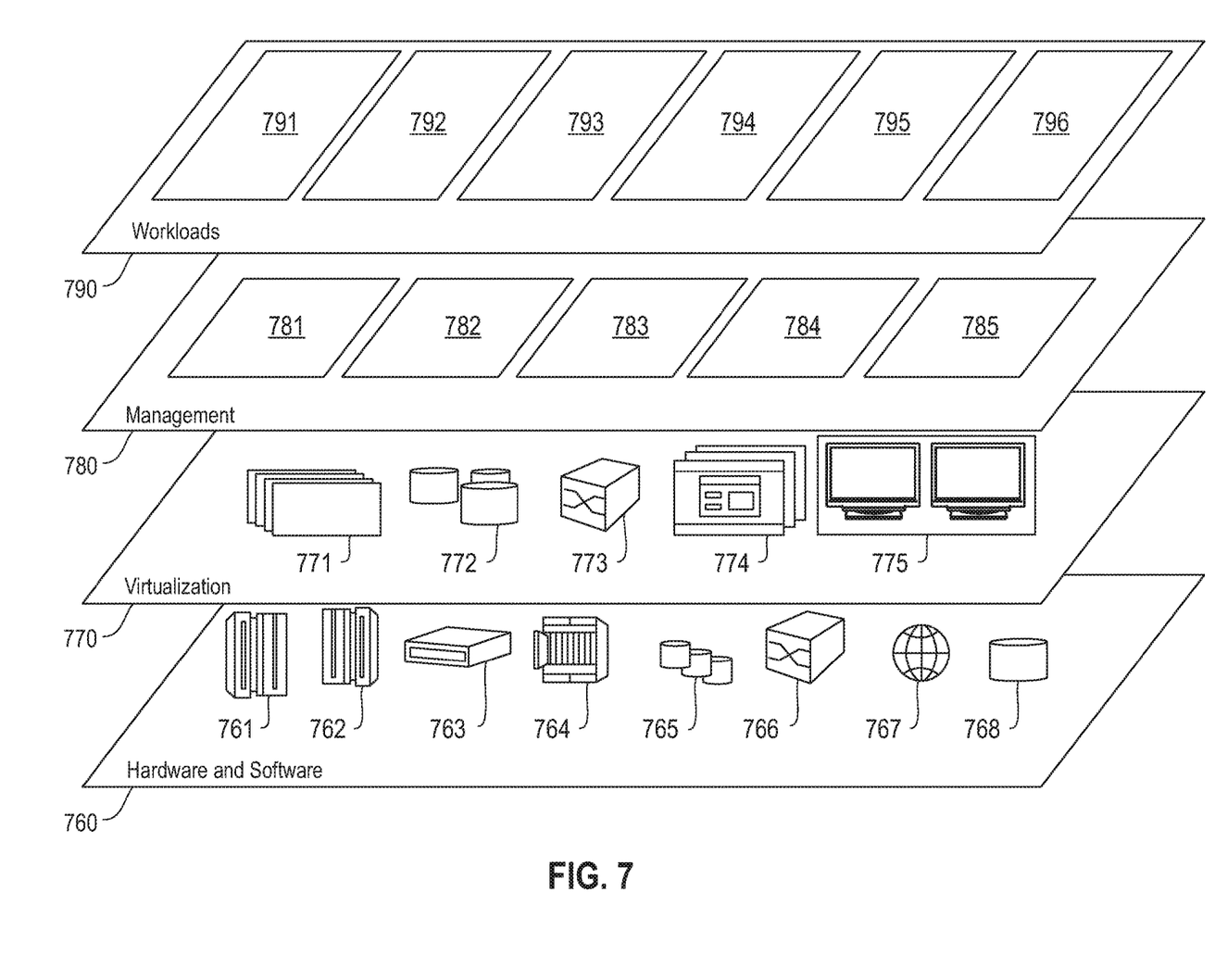
FIG. 7 shows abstraction model layers according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775. In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and dynamic allocation 796, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving an initial decision from each of a plurality of agents based on the same criteria, wherein at least a subset of the plurality of agents are computing nodes, and wherein the criteria pertain to one or more resource allocation requests for performing a rank aggregation process comprising a plurality of rounds;
    for each of the plurality of rounds of the rank aggregation process, performing:
        assigning an equal weight to computing resources specific to each of the plurality of agents;
        generating, for each of the initial decisions, a revised decision based at least in part on (i) comparing the initial decisions to each other, (ii) modeling aggregate group behavior represented by the initial decisions of the plurality of agents, and (iii) modeling a behavior of each respective one of the agents in view of the initial decisions of the plurality of agents by applying an interactive partially observable Markov decision process;
        updating the weights assigned to the computing resources specific to each respective one of the plurality of agents, based at least in part on an accuracy of the modeling of the behavior with respect to the revised decisions of each of the other agents; and
        dynamically allocating computing resources in response to the one or more resource allocation requests based at least in part on the updated weights, wherein the allocating comprises allocating: (i) additional computing resources to at least a first one of the agents and (ii) fewer computing resources to at least a second one of the agents in a next round of the rank aggregation process to improve the accuracy of the modeling for at least the first agent with respect to one or more of the other agents; and
    outputting a finalized decision of the rank aggregation process;
    wherein the method is carried out by at least one computing device.

2. The computer-implemented method of claim 1, wherein said modeling aggregate group behavior comprises applying a Markov Decision Process model to the initial decisions.

3. The computer-implemented method of claim 1, wherein the plurality of agents are anonymous to each other.

4. The computer-implemented method of claim 1, wherein the initial decision of each of the plurality of agents comprises a ranking of a set of items.

5. The computer-implemented method of claim 1, wherein said updating comprises calculating a new weight assigned to the computing resources specific to each of the plurality of agents.

6. The computer-implemented method of claim 5, wherein said updating comprises calculating the new weight based on a weighting value assigned to each computing resource.

7. The computer-implemented method of claim 1, wherein said receiving the initial decision comprises receiving the initial decision via a device of each respective agent.

8. The computer-implemented method of claim 1, wherein one or more subsets of the plurality of agents comprise human users.

9. A computer program product comprising a computer readable storage medium having program instructions embodied therewith, the program instructions executable by a computing device to cause the computing device to:
    receive an initial decision from each of a plurality of agents based on the same criteria, wherein at least a subset of the plurality of agents are computing nodes, and wherein the criteria pertain to one or more resource allocation requests for performing a rank aggregation process comprising a plurality of rounds;
    for each of the plurality of rounds of the rank aggregation process:
        assign an equal weight to computing resources specific to each of the plurality of agents;
        generate, for each of the initial decisions, a revised decision based at least in part on (i) comparing the initial decisions to each other, (ii) modeling aggregate group behavior represented by the initial decisions of the plurality of agents, and (iii) modeling a behavior of each respective one of the agents in view of the initial decisions of the plurality of agents by applying an interactive partially observable Markov decision process;
        update the weights assigned to the computing resources specific to each respective one of the plurality of agents, based at least in part on an accuracy of the modeling of the behavior with respect to the revised decisions of each of the other agents; and
        dynamically allocate computing resources in response to the one or more resource allocation requests based at least in part on the updated weights, wherein the allocating comprises allocating: (i) additional computing resources to at least a first one of the agents and (ii) fewer computing resources to at least a second one of the agents in a next round of the rank aggregation process to improve the accuracy of the modeling for at least the first agent with respect to one or more of the other agents; and output a finalized decision of the rank aggregation process.

10. The computer program product of claim 9, wherein said modeling aggregate group behavior comprises applying a Markov Decision Process model to the initial decisions.

11. The computer program product of claim 9, wherein said updating comprises calculating a new weight assigned to the computing resources specific to each of the plurality of agents.

12. The computer program product of claim 11, wherein said updating comprises calculating the new weight based on a weighting value assigned to each computing resource.

13. The computer program product of claim 9, wherein the plurality of agents are anonymous to each other.

14. The computer program product of claim 9, wherein the initial decision of each of the plurality of agents comprises a ranking of a set of items.

15. The computer program product of claim 9, wherein said receiving the initial decision comprises receiving the initial decision via a device of each respective agent.

16. The computer program product of claim 9, wherein one or more subsets of the plurality of agents comprise human users.

17. A system comprising:
a memory; and
at least one processor operably coupled to the memory and configured for:
receiving an initial decision from each of a plurality of agents based on the same criteria, wherein at least a subset of the plurality of agents are computing nodes, and wherein the criteria pertain to one or more resource allocation requests for performing a rank aggregation process comprising a plurality of rounds;
for each of the plurality of rounds of the rank aggregation process, performing:
assigning an equal weight to computing resources specific to each of the plurality of agents;
generating, for each of the initial decisions, a revised decision based at least in part on (i) comparing the initial decisions to each other, (ii) modeling aggregate group behavior represented by the initial decisions of the plurality of agents, and (iii) modeling a behavior of each respective one of the agents in view of the initial decisions of the plurality of agents by applying an interactive partially observable Markov decision process;
updating the weights assigned to the computing resources specific to each respective one of the plurality of agents, based at least in part on an accuracy of the modeling of the behavior with respect to the revised decisions of each of the other agents; and
dynamically allocating computing resources in response to the one or more resource allocation requests based at least in part on the updated weights, wherein the allocating comprises allocating: (i) additional computing resources to at least a first one of the agents and (ii) fewer computing resources to at least a second one of the agents in a next round of the rank aggregation process to improve the accuracy of the modeling for at least the first agent with respect to one or more of the other agents; and
outputting a finalized decision of the rank aggregation process.

18. The system of claim 17, wherein said modeling aggregate group behavior comprises applying a Markov Decision Process model to the initial decisions.

19. The system of claim 17, wherein the plurality of agents are anonymous to each other.

20. The system of claim 17, wherein the initial decision of each of the plurality of agents comprises a ranking of a set of items.

\* \* \* \* \*